Patented Oct. 10, 1944

2,360,197

UNITED STATES PATENT OFFICE 2,360,197

PROCESSES OF REMOVING FLUORINE FROM SUPERPHOSPHATE

Charles A. Butt, Atlanta, Ga., assignor to International Minerals & Chemical Corporation, New York, N. Y., a corporation of New York No Drawing. Application July 1, 1941, Serial No. 400,646

6 Claims. (Cl. 99—2)

This invention relates to the removal of fluorine from superphosphate, triple superphosphate, or mixtures of the two. The material that is produced is suitable for animal food.

The superphosphate referred to is the article of commerce used largely as a fertilizer, made by treating ground phosphate rock with approximately and equal weight of 50° Bé. sulphuric acid. It is composed for the most part of gypsum, $CaSO_4$, and monocalcium phosphate, $CaH_4(PO_4)_2$, with small amounts of free phosphoric acid and fluorine compounds.

The triple superphosphate sometimes referred to as "treble" or "double" superphosphate is the article of commerce used largely as a fertilizer, made by treating ground phosphate rock with phosphoric acid, or mixtures of phosphoric and sulphuric acids. It is composed largely of monocalcium phosphate, with smaller amounts of gypsum, free phosphoric acid, and fluorine compounds.

In prior attempts to remove fluorine from triple superphosphate by heating the same at elevated temperatures, troubles have arisen because the monocalcium phosphate fused and stuck to the treating chamber, and when the triple superphosphate contained an appreciable amount of sulphates, the heat caused decomposition of the same, thus releasing troublesome amounts of $SO_2$ or $SO_3$ gases which proved difficult to condense. Also, when rotary heaters were used to calcine the triple superphosphate, the fusing caused the material to roll up into large balls which stuck to the sides of the calciner, making the operation difficult. Besides, the fused condition of the material caused fluorine to be entrapped inside the balls, thus interfering with its removal.

In attempts to remove fluorine from superphosphate which contains a large amount of calcium sulphate, by heating the same at elevated temperatures, although the material did not fuse or become sticky, serious difficulties developed due to the copious evolution of $SO_2$ and $SO_3$ gases.

The following is an example of difficulties that have been encountered in attempts to remove fluorine from superphosphate:

Triple superphosphate of the following analysis: Moisture 3.22%, total $P_2O_5$ 48.85%, citrate insoluble $P_2O_5$ 0.98%, available $P_2O_5$ 47.87%, free phosphoric acid ($P_2O_5$) 3.94%, and fluorine 2.06%, was calcined for 15 minutes, with frequent stirring, at 875–900° C. When the temperature had reached 300° C. the material began to soften and fuse, and the tendency to fuse increased as the temperature was increased. It was necessary to remove the material, because of its gummy condition while hot, from the furnace and allow to cool and become brittle, before it could be broken up and stirred. After each such treatment the mass would again fuse and stick together when the temperature was further increased. The final product contained 0.026% fluorine, and 65.54% $P_2O_5$. When ground 100% through 60 mesh it showed on analysis a solubility of the $P_2O_5$ in 0.4% hydrochloric acid solution of only 24.32% when 0.2 gram of sample was stirred in 200 cc. of the acid solution for 6 hours at a temperature of 98–99° F.

By the present invention difficulties due to fusing and sticking, or evolution of troublesome sulphur gases, during the heating period are overcome by adding a basic alkaline earth compound, such as high calcium limestone, dolomite, hydrated lime, or calcium oxide to the superphosphates before heating to temperatures sufficient to cause fluorine to be removed. More specifically, by having more than enough of the basic alkaline earth compound to neutralize the free acid present, or having present an excess thereof above the amount required to form monocalcium phosphate with the free phosphoric acid, the tendency of the mass to fuse or evolve sulphur gases when the material is calcined is overcome, while a sufficient amount of fluorine is removed to make the material suitable for animal food; that is, less than about 0.20% of fluorine remains.

For example, in carrying out the present invention, water or phosphoric acid is added to a mixture of superphosphate, or triple superphosphate, or a mixture of the two and lime, and the mixture is stirred while the water or phosphoric acid is being added. It is then allowed to stand until the lime is neutralized, then calcined, whereupon the fluorine is reduced to less than about 0.20% without difficulties due to fusing and sticking of the material or evolution of the troublesome sulphur gases.

The following are given as illustrative specific examples of ways to carry out the invention, but it is understood that the invention is not restricted to these examples.

Example I 100 parts by weight of triple superphosphate of the same analysis as in the example above showing fusing and sticking, were mixed with 14 parts of powdered calcium carbonate and 40 parts of water. The mixture was then permitted to stand until it set. It was then dried and calcined for 20 minutes at 900° C. with frequent stirring. The material did not become fused or sticky. The resulting product contained 0.047% fluorine and 55.00% $P_2O_5$. It was ground 100% through 60 mesh and a portion on analysis showed a solubility of the $P_2O_5$ of 98.80% by the same method as explained above.

Example II

The same as Example I, except that 28 parts of $CaCO_3$ and 60 parts of water were used. The material did not fuse or become sticky. The remaining fluorine was 0.129%, and the product was readily soluble in 0.4% hydrochloric acid solution.

Example III 100 parts by weight of triple superphosphate of the same analysis as in the example above showing fusing and sticking were mixed with 20 parts of dolomite which was ground 100% through 100 mesh and with 24 parts water. After 6 days the mixture was dried and calcined for 15 minutes at 875–900° C. with frequent stirring. The material did not fuse or become sticky. The product contained 0.120% fluorine, and was readily soluble in 0.4% hydrochloric acid solution.

Example IV 100 parts by weight of triple superphosphate of the same analysis as in Example III were mixed with 13.3 parts hydrated lime and 14 parts of water. After standing 2 days it was screened through 8 mesh, then calcined for 15 minutes at 875–900° C. with frequent stirring. The material did not become fused or sticky. The final product contained 0.024% fluorine, and was readily soluble in 0.4% hydrochloric acid solution.

Example V

Superphosphate made by treating ground phosphate rock with sulphuric acid, having the following analysis: Moisture 7.76%, total $P_2O_5$ 20.05%, citrate insoluble $P_2O_5$ 0.36%, available $P_2O_5$ 19.69%, free phosphoric acid ($P_2O_5$) 3.18%, and fluorine 1.44%, was heated for 15 minutes, with frequent stirring, at a temperature of 875–900° C. Fumes of $SO_2$ and $SO_3$ began to evolve at about 650° C., and were evolved copiously as the temperature was increased. The final product contained 0.016% fluorine and was readily soluble in dilute hydrochloric acid.

Example VI 100 parts by weight of superphosphate of the same analysis as in Example V were mixed with 8.7 parts of powdered calcium carbonate and 33 parts of water and cured for 2 hours. The mass was then calcined for 15 minutes, with frequent stirring, at a temperature of 800° C. Only a slight amount of $SO_2$ and $SO_3$ gases was evolved. The final product contained 0.056% fluorine, and was readily soluble in dilute hydrochloric acid.

Example VII 100 parts by weight of superphosphate of the same analysis as in Example V were mixed with 5.3 parts of hydrated lime and 4 parts water. The mixture was cured 1 day and then calcined for 15 minutes, with frequent stirring, at a temperature of 875–900° C. with only slight evolution of $SO_2$ and $SO_3$ gases. The final product contained 0.034% fluorine and was readily soluble in dilute hydrochloric acid.

Example VIII 77.8 parts by weight of superphosphate of the same analysis as in Example V and 22.2 parts triple superphosphate of the same analysis as in the example above showing difficulties were mixed with 10 parts of hydrated lime and 6 parts water and left to cure for four hours. The mass was then screened through 8 mesh and calcined for 15 minutes, with frequent stirring, at a temperature of 875–900° C. There was no appreciable evolution of $SO_2$ and $SO_3$ gases. The final product contained 0.060% fluorine, and its solubility in dilute hydrochloric acid was high.

Example IX 100 parts by weight of superphosphate of the same analysis as in Example V were mixed with 29.6 parts of powdered $CaCO_3$ and 61.8 parts of 25° Bé. commercially pure phosphoric acid (24% $P_2O_5$ solution). The amount of $CaCO_3$ added was sufficient theoretically to convert the phosphoric acid added into monocalcium phosphate with 19 parts in excess. The mixture was allowed to set, then broken down and allowed to cure for 4 days. It was then calcined for 15 minutes, with frequent stirring, at a temperature of 875°–900° C. There was no appreciable evolution of $SO_2$ or $SO_3$ gases. The final product contained 0.033% fluorine, and was readily soluble in dilute hydrochloric acid solution.

In the claims, where the expression "basic alkaline earth compound" is used, it is intended to include dolomite, high calcium limestone or calcium carbonate, hydrated lime, and calcium oxide. The word "superphosphates" is intended to include superphosphate, superphosphate to which phosphoric is added for the purpose of increasing the $P_2O_5$ content, triple superphosphate (sometimes called treble or double superphosphate), mixtures of superphosphate and triple superphosphate, or other materials the phosphorus content of which is chiefly in the form of monocalcium phosphate.

What is claimed is:

1. The process of removing fluorine from triple superphosphates, which comprises adding thereto an amount of a basic alkaline earth compound sufficiently in excess of that required to neutralize the free acid so as to prevent fusing or evolution of sulphur gases during calcination and heating to a temperature sufficiently high to remove enough fluorine to render the product safe for use in animal food.

2. In the process of removing fluorine from triple superphosphate, the step which comprises adding to the superphosphate an amount of a basic alkaline earth compound sufficiently in excess of that required to neutralize the free acid so as to form monocalcium phosphate with the free phosphoric acid present and an excess above this amount to prevent fusing or evolution of sulphur gases when heated at a sufficiently high temperature to remove enough fluorine to render the product safe for use in animal food.

3. The process of removing fluorine from triple superphosphates, which comprises adding thereto an amount of a basic alkaline earth compound sufficiently in excess of that required to neutralize the free acid so as to prevent fusing or evolution of sulphur gases and heating to a temperature sufficiently high to reduce the fluorine in the calcined product to less than 0.20%.

4. The process of removing fluorine from triple superphosphates, which comprises adding thereto an amount of a basic alkaline earth compound sufficiently in excess of that required to neutralize the free acid so as to prevent fusing or evolution of sulphur gases during calcination and heating to a temperature of about 875–900° C.

5. The process of removing fluorine from triple superphosphates, which comprises adding thereto an amount of calcium carbonate sufficiently in excess of that required to neutralize the free acid so as to prevent fusing or evolution of sulphur gases during calcination and heating to a temperature sufficiently high to remove enough fluorine to render the product safe for use in animal food.

6. The process of removing fluorine from triple superphosphates, which comprises adding thereto an amount of hydrated lime sufficiently in excess of that required to neutralize the free acid so as to prevent fusing or evolution of sulphur gases during calcination and heating to a temperature sufficiently high to remove enough fluorine to render the product safe for use in animal food.

CHARLES A. BUTT.